(12) United States Patent
Bryan

(10) Patent No.: US 11,661,896 B2
(45) Date of Patent: May 30, 2023

(54) ENGINE OVERSPEED DEVICE AND METHOD

(71) Applicant: Gas Activated Systems, The Woodlands, TX (US)

(72) Inventor: Michael A. Bryan, Spring, TX (US)

(73) Assignee: Gas Activated Systems, The Woodlands, TX (US)

(*) Notice: Subject to any disclaimer, the term of this patent is extended or adjusted under 35 U.S.C. 154(b) by 0 days.

(21) Appl. No.: 17/107,021

(22) Filed: Nov. 30, 2020

(65) Prior Publication Data

US 2021/0310428 A1    Oct. 7, 2021

Related U.S. Application Data

(63) Continuation-in-part of application No. 15/980,445, filed on May 15, 2018, now Pat. No. 10,851,728.
(Continued)

(51) Int. Cl.
*F02D 41/00* (2006.01)
*H04W 12/00* (2021.01)
(Continued)

(52) U.S. Cl.
CPC ..... *F02D 41/0002* (2013.01); *F02D 41/0027* (2013.01); *F02D 41/042* (2013.01);
(Continued)

(58) Field of Classification Search
CPC ............ F02D 41/0002; F02D 2200/04; F02D 41/021; F02D 17/04; F02D 41/22;
(Continued)

(56) References Cited

U.S. PATENT DOCUMENTS

| | | | | |
|---|---|---|---|---|
| 5,311,851 A | * | 5/1994 | Wright, Jr. | F02D 17/04 123/198 D |
| 5,592,387 A | * | 1/1997 | Shelef | F02D 17/04 123/198 B |

(Continued)

FOREIGN PATENT DOCUMENTS

CN    102621966 A    4/2019

OTHER PUBLICATIONS

PCT International Search Report and Written Opinion from Appl. No. PCT/US2018/068013 dated Apr. 16, 2019, 12 pages.

*Primary Examiner* — Sizo B Vilakazi
(74) *Attorney, Agent, or Firm* — Lexigent LLC

(57) ABSTRACT

Methods, systems and devices for evaluating incoming air to an engine, industrial controller including engine controls, valves and solenoids, for concentrations of explosive or combustible gases or vapors, and actuating process control including but not limited to shutting down an engine or other industrial process to control an outcome including the prevention of an overspeed condition when pre-set or calculated elevated gas or vapor concentrations are detected. In some embodiments industrial control including engine shutdown may be achieved conventionally via an electronic kill signal, a shutdown of the fuel injector, carburetor or fuel pump, and in emergency conditions by the shutoff of incoming air to an air intake, turbocharger, or other air delivery systems. Decisions based on explosive gas or vapor concentrations and species and the use of networking to allow additional systems to take action before explosive gases or vapors reach said other valve-sensor devices can provide additional safety.

9 Claims, 8 Drawing Sheets

Related U.S. Application Data

(60) Provisional application No. 62/662,977, filed on Apr. 26, 2018, provisional application No. 62/617,855, filed on Jan. 16, 2018, provisional application No. 62/617,899, filed on Jan. 16, 2018, provisional application No. 62/611,391, filed on Dec. 28, 2017, provisional application No. 62/525,470, filed on Jun. 27, 2017, provisional application No. 62/506,248, filed on May 15, 2017.

(51) Int. Cl.
| | |
|---|---|
| *F02D 41/04* | (2006.01) |
| *F02D 41/14* | (2006.01) |
| *F02D 41/22* | (2006.01) |
| *G08B 21/16* | (2006.01) |
| *G08B 25/00* | (2006.01) |
| *H04W 88/16* | (2009.01) |

(52) U.S. Cl.
CPC ......... *F02D 41/1441* (2013.01); *F02D 41/22* (2013.01); *G08B 21/16* (2013.01); *G08B 25/009* (2013.01); *H04W 12/009* (2019.01); *H04W 88/16* (2013.01); *F02D 2041/225* (2013.01); *F02D 2200/04* (2013.01); *F02D 2200/0602* (2013.01); *F02D 2200/0611* (2013.01)

(58) Field of Classification Search
CPC ............. F02D 2200/101; F02D 41/144; F02D 41/0027; F02D 41/0025
See application file for complete search history.

(56) References Cited

U.S. PATENT DOCUMENTS

| | | | |
|---|---|---|---|
| 7,345,590 B2 | 3/2008 | Nakano et al. | |
| 8,944,014 B2* | 2/2015 | Cutlip | F02M 21/0215 123/3 |
| 9,109,935 B2 | 8/2015 | Yang et al. | |
| 9,652,955 B1 | 5/2017 | Ray et al. | |
| 2010/0217500 A1* | 8/2010 | Watkins | F02D 19/027 701/103 |
| 2013/0311558 A1 | 11/2013 | Kim et al. | |
| 2017/0171692 A1 | 6/2017 | Shinohara | |

\* cited by examiner

ENGINE OVERSPEED DEVICE AND METHOD

CROSS-REFERENCE TO RELATED APPLICATIONS

This application is a continuation-in-part of U.S. application Ser. No. 15/980,445, filed on May 15, 2018, which claims the benefit of U.S. Provisional Application No. 62/506,248, filed May 15, 2017; U.S. Provisional Application No. 62/525,470, filed Jun. 27, 2017; U.S. Provisional Patent Application No. 62/611,391, filed Dec. 28, 2017; U.S. Provisional Application No. 62/617,855, filed Jan. 16, 2018, and U.S. Provisional No. 62/617,899, filed Jan. 16, 2018; U.S. Provisional Application No. 62/662,977 filed Apr. 26, 2018; the disclosures of which are incorporated herein by reference in their entireties including all references and appendices cited therein, for all purposes as if fully set forth herein.

TECHNICAL FIELD

The present disclosure is in the field of engine over speed protection devices for naturally aspirated engines and is more specifically in the field of explosive gas mixed with incoming air analysis and action.

BACKGROUND

Gas and other flammable fuels may be used in a variety of industrial and home applications. When there is an anomalous event, such as a fire or a process upset, prompt shutdown or shut off of the fuel source may be needed to prevent a catastrophic event. Present methods of detection of anomalous events are limited in range of detection and types of anomalous events being detected. Furthermore, current engine overspeed shutoff devices which use RPM based sensors to detect an anomalous event are generally only responsive to an event after the emergency is unfolding and it is too late to manage the emergency in any method other than an emergency engine air shutoff.

Known examples of runaway engines causing catastrophic problems include the Texas City refinery explosion in March of 2005, where a hydrocarbon cloud was ignited by a pickup truck RPM over speed engine. This was the second largest oil refinery in Texas and resulted in criminal charges of the managing company, who has paid over $1.6 B in victim compensation, $50M in federal fines, $32M to universities and hospitals, and an OSHA imposed $87M fine. Other well-known examples caused, at least in part, by runaway engines include the Deepwater Horizon explosion in the Gulf of Mexico with a total cost to the company of over $62 B.

Regarding engine overspeed shutdown systems, conventional gas over speed shutoff devices are either manually activated at an operator's prerogative or set to actuate at a pre-set RPM over speed, conventionally say 120% of engine maximum RPM. Once the device is activated, the engine is oftentimes rendered unusable due to seals being pulled out of their seats and other destructive events that occur when the aspirated air for an engine is suddenly and instantaneously shut off. In the event of an actual emergency unfolding, a generator engine, for example, being taken off line can result in even greater damage at a facility as emergency electricity and power would be shut off when the overspeeding engine is taken off line. If the engine is rendered unusable by the shutoff, a potentially more dangerous situation has been created. Further, when the target trigger RPM is reached, a danger with the unfolding events may already exist. Thus, evacuation, explosion, or other hazards may prevent a user from actuating a manually triggered device.

Accordingly, methods, systems, or devices that can shut down an engine before an overspeed condition occurs or damage is caused by an overspeed condition would be an improvement in the art. Such a method or system that reduced or prevented damage from an abrupt shutdown of an overspeeding engine would be a further improvement in the art. It would be desirable for such improved systems to be able to form a dynamic network that allowed individual members to come and go, while providing a robust monitoring platform. It would be further desirable wherein such systems and methods allowed for action to be taken with certain devices that have not yet sensed a gas event in anticipation of a future event or an imminent event. Further, events may be viewed on a web-based browser. The settings of each device in a network may be uniquely controlled by access from a browser-based controller including, but not limited to, gas species to activate, concentration to activate, and radius of sensors in the local mesh network.

BRIEF SUMMARY

Some embodiments allow setting of thresholds of level sensors. A gateway or central controller can be configured to handle the control. Some embodiments utilize one of a gateway with cloud dashboard, a tablet with app, a phone with app to set the levels. This is a wired or wireless connection (LORA, BLE, WIFI ZIGBEE, etc.) that can set the levels of a sensor that does not have a screen such as one that is under the hood of a truck, car or service device like light tower or power washer.

An application or cloud can access each individual sensor can be seen and the trigger point can be set. The sensor has some number say five different gas levels it can trigger on. Each can be set individually. That is, the lightest gas (hydrogen) can have a threshold to trigger, say 10% LEL (lower explosive limit) and another gas, say the heaviest gas can have a entirely different threshold (say 50% LEL). Or they can all be set together.

Thus, a controller can be used to set each device, or a controller or gateway and cloud can be used to set all devices in a common geography, say a oil drilling pad, to the same value, or using a check in/check out model (where when a truck for instance approaches a given job site, it is automatically a member of the collection of sensors for that site) its trigger points are automatically set corresponding to the levels or values the company mandates for that site.

Some embodiments include a tablet and application, phone with app, cloud or dedicated workstation that can monitor and display the location and all acquired data of each given device on a given job site like a drilling pad, a factory or a refinery. The controller will subscribe members to the group based on proximity. That is, when a truck rolls onto site, it becomes a member and gets its parameters set by means of wireless communication. For the period of time the truck is on the site, its settings correspond to those values the job site demands. When the truck leaves the jobsite the controller gateway will remove that truck from the list of members. That is important because the range of LoRa radio can be 700 miles or more. If the truck was 50 miles down the road and got a big gas exposure, if it was still subscribed to the job site, it would register as if the truck was having a problem and cause other valves to shut down possibly.

Some systems disclosed herein can be used to record sensor data. Each sensor that is conjunction with an overspeed valve has a computer running it. That data (gas exposure, location by GPS, time, gas type, temperature pressure and humidity) can be recorded either locally on the device, can be sent by wireless means to the gateway controller or can be sent from the gateway controller to the cloud for storage in an online database.

Next the devices can be coordinated at a given site by the gateway and controller. At a job site such as a drilling pad, a refinery or similar, the gateway controller manages functions including, but not limited to setting the geometric bounds of the job site. What is the meets and bounds or the radius that defines if a given device is in or out of the job site?

Again, in some embodiments a tablet, phone, dedicated device, laptop or computer that has wired or wireless connection to the detector to set in advance its trigger points. This can be an app that connects via Bluetooth, wifi, lora or other means or is connected by a wire—but the trigger values and the trigger points for each of the individual gas bins can be set by this device.

A central controller can orchestrate sensor functionality. A central controller that gives a star topology with each detector having to collaborate with the central controller can be used. However, each of the detectors/sensors can have a computer or microprocessor already in it so can enable a configuration where each detector coordinated with other detectors in a true MESH network and there is no need of a central controller. All the computing power is in each detector and they coordinate their actions.

Per the above, the software and detectors are such that one detector at a site is 'elected' to me the master and the rest are slaves to it. All are made equally and any one can be master. If that master gets damaged or out of range, another will become the new master controller.

Using the central controller, or gateway, the data from each sensor including location, gas type and concentration, time, environmental values like temperature, humidity and atmospheric pressure can be recorded first on the central controller or gateway and then transferred to the cloud for permanent storage and monitoring.

Because each sensor has internal a GPS as well as LORA radio, the gateway can keep track of the location of each device at a job site. A cloud based controller can be set to define the size of the jobsite, when a device arrives and leaves in a job site that is it checks in and checks out. A gas device associated with a given location must be de-subscribed when leaving the site so something adverse that happens 30 miles away does not affect the local performance of the devices.

The present disclosure is directed to systems and methods that may include detecting a concentration of an explosive or flammable gas in an incoming air stream to an engine. Illustrative methods may further include sending a shutdown signal to stop the engine before enough concentration to cause overspeed or damage is done. In some embodiments, a gas monitoring device may be placed on or near engines, motors, or appliances to detect leaks and shut off an air supply to the engine or motor.

In one illustrative embodiment of a method in accordance with the present disclosure, a diesel or other fuel engine is shut off either electrically or by means or closing an air intake valve when a gas sensor determines that an explosive gas is in the incoming air stream. In one example, the engine may be stopped after explosive gas detection by the transmission of an electrical kill signal to the engine, an engine computer, or an electrical port or connector associated with a vehicle. This presupposes the concentration of gas is at a detectable level, but below a concentration that would cause a runaway or overspeed engine feeding from combustible gas or vapor in the incoming air stream.

The electrical kill signal may be an electronic signal that can be sent to stop the engine in a conventional fashion such as stopping the power in a gasoline engine or shutting off the fuel supply in a diesel engine or sending a kill signal to the on-board computer. If gas is detected and the engine is in an overspeed condition, the signal can be sent to a butterfly or other intake air shutoff valve to stop the air being received by the air intake and subsequently into the engine. In another example, the engine may be stopped after gas detection by the use of a valve, such as a butterfly valve, gate valve, or other valve to meter the air, reducing its flow as well as stopping air flow if the engine is in an overspeed condition, to stop the air being received by the air intake and subsequently into the engine. It will be appreciated that in addition to a valve, other metering protocols or equipment could be used.

Systems and devices for such methods may utilize one or more gas sensors that can determine low concentrations of explosive gas and may be able to determine the specific species of the gas and then take action based on relevant factors, such as the species, concentration, rate of concentration increase of the gas, and the location of the engine to which the sensor assembly is located proximate. Where advantageous, the sensors may have the ability to communicate either by wired or wireless means and to send signals to systems that have not yet detected any explosive gas, in order to take action even before a gas signature is received at a specific engine sensor. Device and systems for such methods may have a microprocessor or other controller that can implement software or firmware or other instructions to cause desired actions from sensed inputs. Additionally, such systems may have wired or wireless means for communication with other sensor systems, to allow for a central or local controller, and with cloud or other remote facilities.

In addition, the controller, firmware, or software may take action based on measured, calculated, or existing results. Specifically, illustrative devices may take appropriate action based on gas concentration, rate of increase, gas species, and location. Such devices may also have an on-board power system such that if the power to the engine or supplied power is interrupted, the device will continue to function such that the engine can be shut off electronically or an air intake valve can be actuated when required. This may be in the form of externally supplied power, battery, capacitor, fuel cell, solar cell, motion-based generator, or other method to supply the required electricity to a device, including power to the wireless radios.

In some embodiments, the devices may have a capability to form a network based on other sensors in other engines. It will be appreciated that for such embodiments, some devices may be located at fixed positions and others disposed on mobile devices that may enter and leave the network from time to time. Such systems may preferably have the ability to display status, results, actions and other information on mobile devices like mobile phones, tablets, or dedicated devices such as laptops or other displays. It will be appreciated that such systems may have the ability to have a local central controller and a cloud-based system as well for monitoring and control through the network.

In other embodiments where the devices and systems further comprise a microprocessor or other means to follow electronic instructions in software or firmware to analyze gas species, concentration, rate of increase of gas and the like, they may be designed to take appropriate action based on some or all of those factors or other factors. For example, the system may be configured to shut off an engine upon detection of smoke or fire alarms, severe weather such as tornadoes and hurricanes, and seismic events, either from a sensor in communication with the system or from an external source of information. In some embodiments, such devices or systems may shut off an engine when an emergency broadcast event, a specific emergency signal, or emergency events like earthquakes are detected. In addition, the device may contain a system known as lock out or tag out wherein all wireless signals are turned off for a pre-set or indeterminate amount of time for such times as all wireless signals must be stopped. Such events may be common during the use of explosives.

It will be appreciated that the parameters of control for the system can be changed by user intervention using for instance an application on a mobile device or tablet. It will be appreciated that the control may require specific level of authorization associated with a given user.

The detection of explosive or flammable gas in an airflow in the illustrative embodiments may be accomplished by several means including gas detectors, and further including what is known as a system on a chip (SoC) wherein the SoC comprises a microchip capable of gas detection by a nanosensor such as physical characterization sensors (i.e., density, thermal conductivity, diffusion rate, evaporation rates, redox sensor, solubility sensors, differential calorimetry and differential thermal analysis, and physical separation such as chromatography). Other sensors may comprise pellistor or catalytic bead sensors, infrared sensors, hot filament combustions byproduct detectors, optical florescence detectors, visible infrared or UV spectrometer, gas density measurement devices, dual-beam optical interferometric lidar (DIAL) detectors, photoionization detectors (PID), and mixed metal oxide detectors (MMOs). It will be appreciated that any sensor that may be used to evaluate the intake air for combustible products in real time in to allow for taking steps to prevent a runaway condition in accordance with the present disclosure may be used.

The SoC, single sensor, or an array of sensors, or other gas detection means may be located near or in an engine air intake or can be located in a fixed or mobile site outside of an engine compartment or enclosure. In some embodiments, the SoC, single sensor, or array of sensors may be affixed to or near fixed or mobile assets. In various embodiments, the sensors can send a signal to a valve directly for shut off, send a signal to a control system close to the valve, send a signal to an on-board processor for analysis and action, or send a signal to a cloud-based system for processing and action.

The present disclosure includes devices and systems that evaluate the explosive, flammable, or combustible components in the air intake of an engine before an out of control event protocol is implemented to allow the engine to be shut off or controlled by means of electronic shutoff signals to the engine system, or by means of a valve that closes to stop air from entering the air intake of the engine. Illustrative detector systems take action, via software, hardware and firmware, about sending kill signals, about valve action and control as well as sending a command to take action to a network of other sensor devices that can take decisive action prior to an explosive concentration of gas spreading to engines nearby. In addition, the present disclosure includes devices and systems that are able to form a dynamic network allowing detector systems that are mobile on vehicle engines such as truck engines, car engines, mobile assets and fixed assets and the like, to come and go such that when the assets are within a certain radius, they are members of the local network and when the vehicles drive away from a site and pass a pre-determined distance, the device is dropped from the local detector network. This allows action to be taken with devices that have not sensed a gas event in anticipation of a future or imminent event from a spreading front of gas that is soon to be close to another sensor and engine. Networks that can be used for long range wireless include LoRA and Zigbee to name two of many choices of long-range networks.

Where the illustrative devices can be wired or wirelessly networked to other valve-sensor devices, this allows engine control and kill signals to be sent and/or valves to be actuated in advance of an engine runaway event. Further, the information can be logged or recorded either locally or remotely such that systematic events can be evaluated, as well as providing an historic or forensic record of events including the response to a signal from a potentially large number of sensor devices. In this context, the phrase "sensor device" refers to the entire collection of all hardware, software, and firmware described herein. This can provide not only physical protection but potentially legal protection as well.

The foregoing has outlined rather broadly the features and technical advantages of the present disclosure in order that the detailed description that follows may be better understood. Additional features and advantages of the embodiments in accordance with the present disclosure will be described hereinafter. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of this disclosure and are within the scope of the appended claims.

BRIEF DESCRIPTION OF THE DRAWINGS

It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

Figure 1:
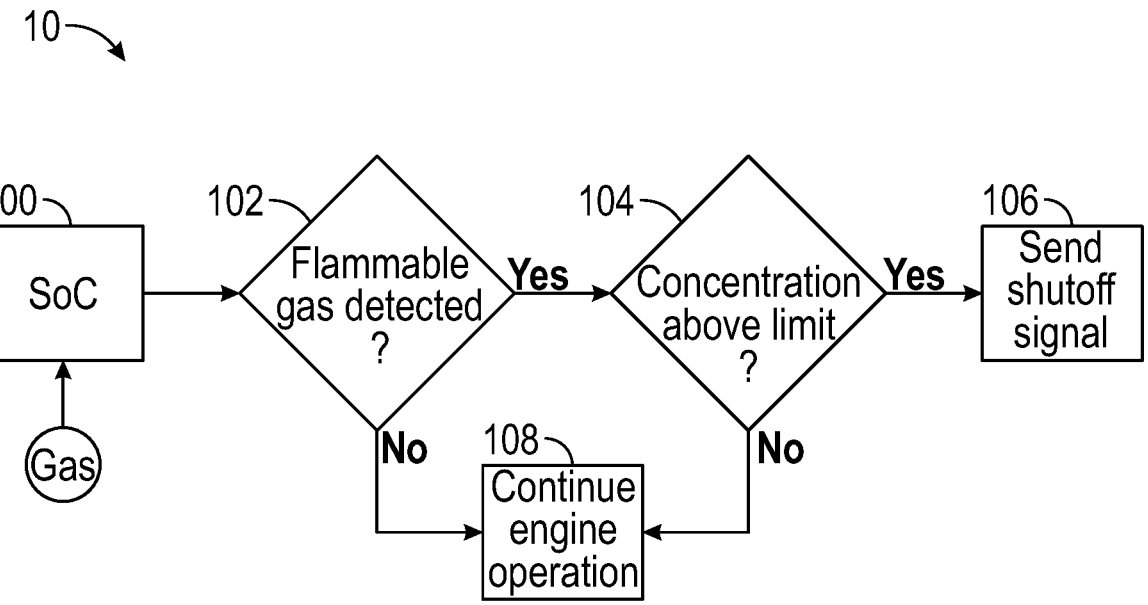
FIG. 1 depicts a flowchart for determining when to shut down a device such as an engine, in accordance with one aspect of the present disclosure.

It will be appreciated by those skilled in the art that the embodiments herein described, while illustrative, are not intended to so limit this disclosure or the scope of the appended claims. Those skilled in the art will also understand that various combinations or modifications of the embodiments presented herein can be made without departing from the scope of this disclosure. All such alternate embodiments are within the scope of the present disclosure. It will be appreciated that the examples and details given herein that are illustrative of a particular embodiment are not limiting of the present disclosure.

Fire and explosion are some of the most serious hazards associated with hydrocarbon production. During drilling, fracturing, completions and other oil well exploration and production processes, there are ample opportunities for hydrocarbon gas or vapor to be released and to enter an engine. The occupational safety and health administration (OSHA) has recognized the dangers associated with flammable and explosive gases and vapors at sites such as oilfields and have issued several regulations regarding limited and protective access zones. OSHA Regulation 29 CFR 1910.399, the contents of which are incorporated by reference herein, was created to define potentially hazardous areas of an oil and gas operation. 30 CFR Part 250.610 and 30 CFR Part 250.803(b)(5)(ii) for off-shore diesel engines, 30 CFR Part 36, API Recommended Practice 54, 46 CFR 58.10-15 Gas Turbine Installations, and ISO 3046-6:1990, to name a few. Based on current understanding and interpretation of these regulations, the entirety of an oil and gas location may be potentially classified as an explosive area, making it impossible to operate equipment or motors within the location. Realizing the regulation would be impossible to implement, OSHA and the American Petroleum Institute (API) established another regulation referred to as API Recommended Practice 505, the contents of which are incorporated by reference herein. This regulation establishes a safe working distance of 10 feet from tanks containing hydrocarbons that could potentially release explosive gases. The regulations set a broad area of operation for motorized equipment and do not account for factors such as wind direction and heavier than air gases which may pool in low lying areas or build up in static wind conditions among many other considerations. In response to perceived shortfalls in the current regulations, most companies have established additional internal safety regulations that are more restrictive than the OSHA and API regulations.

Some examples of company regulations include limiting access to potentially hazardous areas, as well as, the incorporation of Emergency Shut Down Systems (ESDs) that may be actuated during the event of a hydrocarbon release. Some ESDs are set up to function automatically in conjunction with an air shutoff valve on the air intake of an engine. Other ESDs must be manually actuated in the event of an overspeed event due to combustible or explosive materials in the air intake.

A typical engine may run on a combustible mixture of fuel and air. Fuels are generally gasoline, diesel, alcohol, natural gas, or other combustible liquid vapor or gas. The engine management system may determine an appropriate amount of fuel and air to inject into the engine to generate the power, typically measured in horsepower (HP) or kilowatts (kW), and required revolutions power minute (RPM) for a particular application. However, when the engines are able to access an unregulated and uncontrolled fuel source such as a hydrocarbon vapor or gas in the air or surrounding areas, an uncontrolled increase in RPM can occur until the fuel air mixture is stabilized or reduced. The engine may also be able to use unconventional or unintended fuel such as oil leaking past seals in a turbocharger, leaking hydraulic fluids introduced in a turbocharger or air intake, oil mist from faulty equipment, and many others. Any such unregulated fuel source can cause the engine to increase in RPM. An uncontrolled increase of RPM may proceed until the engine exceeds the engineering limits of the materials it is constructed from and catastrophically fails. The resulting explosion may further ignite gases nearby leading to an even larger explosion, as was the case with the Texas City Refinery fire.

Referring now to FIG. 1, there is depicted a flow diagram for operation of a gas detection system 10. A detector receives a sample and analyzes it for flammable or explosive gases or vapors as graphically depicted at 100 and 102. The detector and associated system identifies and quantifies the gas and determines if the engine would operate in a dangerous condition if the air and flammable or explosive gas were introduced into the engine. As shown at 104, if it is determined that the engine would be operating in an unsafe condition where the incoming air contains sufficient gases or vapors to cause potential issues, a kill signal is sent to shut the engine down by any of the previously mentioned means, as depicted at 106. Where the conditions are determined to be safe, the engine operation continues, as depicted at 108.

Figure 2:
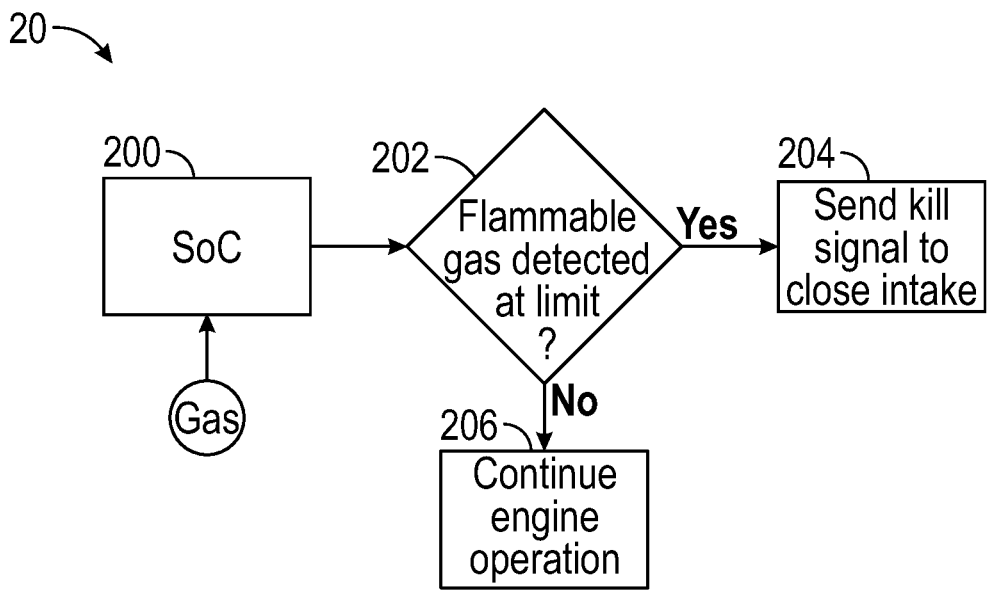
FIG. 2 depicts a flowchart of a failsafe backup system for shutting down a device such as an engine by means of an air shutoff valve, in accordance with another aspect of the present disclosure.

FIG. 2 similarly depicts a flow diagram for a gas detection system 20 where the detector is directly connected to an engine air intake in a failsafe or redundant fashion. A detector receives a sample and analyzes it for flammable or explosive gases or vapors as graphically depicted at 200 and 202. The detector and associated system identifies and quantifies the gas and determines if the engine would operate in a dangerous condition if the air and flammable or explosive gas were introduced into the engine. As shown at 204, if it is determined that the engine would be operating in an unsafe condition where the incoming air contains sufficient gases or vapors to cause potential issues, a kill signal is sent to the engine air intake valve to close. Where the conditions are determined to be safe, the engine operation continues, as depicted at 206.

Figure 3:
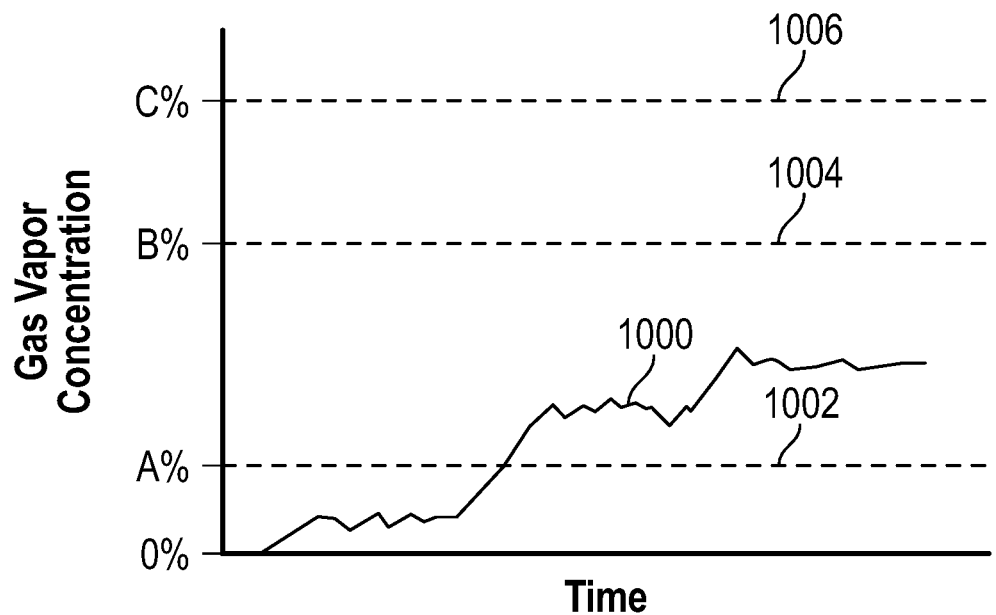
FIG. 3 depicts a graphic illustrating the detection of gas levels by a sensor in accordance with the present disclosure above detection threshold but below sustaining combustion levels.

FIG. 3 depicts a graphic illustrating the detection of gas levels by a sensor in accordance with the present disclosure above detection threshold but below sustaining combustion levels. This may occur during the processes described in connection with the flow diagrams of FIGS. 1 and 2. As a system in accordance with the present disclosure operates, the gas levels in air near an engine may be analyzed as the engine operates. The analyzed levels are presented as line 1000 where the horizontal axis is time and the vertical axis is concentration of the gas vapor. A detection threshold indicated at dashed line 1002 represents a concentration of gas vapor detectable by the sensor and capable of being tracked by the system. A cutoff threshold indicated at 1004 represents a detected concentration of vapor at which the system will send a kill signal to the engine as discussed herein. While the cutoff threshold can represent a concentration of gas vapor capable of sustaining combustion, in some embodiments it represents a concentration where a shutdown signal to cease engine operation in a standard manner (such as shutting down electrical components or supplied fuel) before a dangerous condition occurs, in accordance with the process depicted in FIG. 1. As depicted at 1006, a higher failsafe threshold can represent a concentration where an overspeed condition may occur or has started to occur and a failsafe or redundant kill signal causes a valve to close and terminate all airflow into the engine's air intake, in accordance with the process of FIG. 2.

Figure 4:
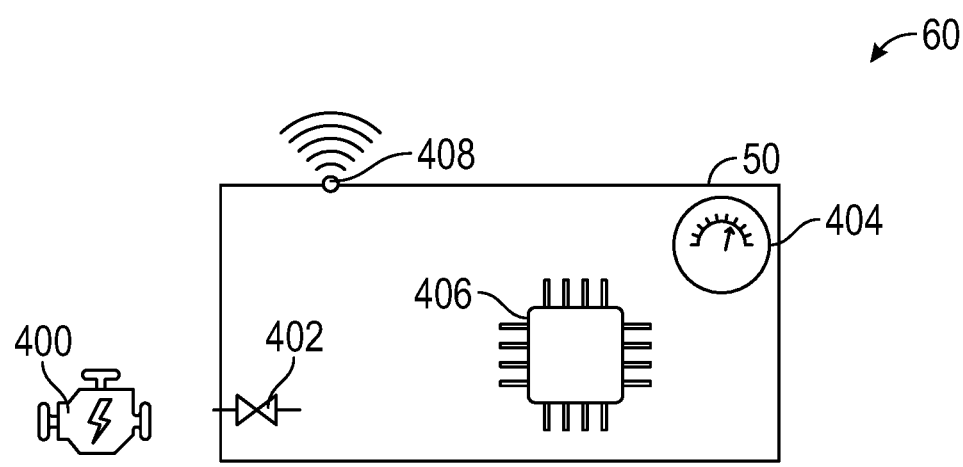
FIG. 4 depicts a schematic arrangement of a gas sensor connected to a single engine which can be useful in some embodiments in accordance with the present disclosure.
Figure 5:
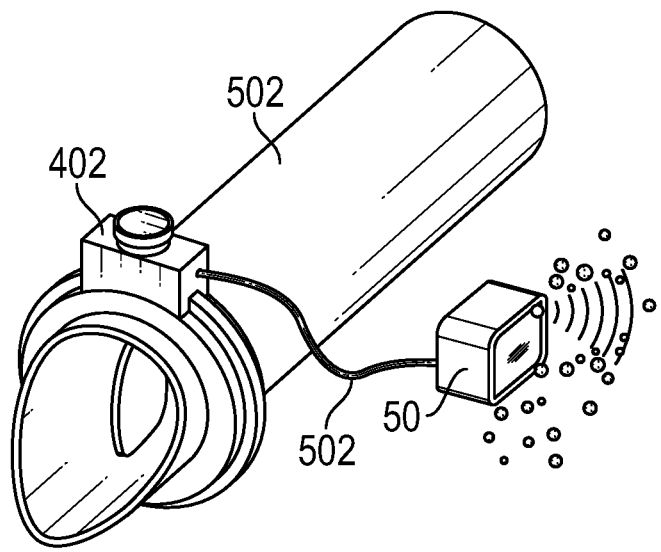
FIG. 5 depicts a sensor device in proximity and connection to an air intake valve that may be used in some embodiments in accordance with the present disclosure.

Turning to FIGS. 4 and 5 a schematic arrangement and a graphic illustration, respectively, of a gas sensor assembly 60 connected to a single engine which may be useful in some embodiments in accordance with the present disclosure, are depicted. As depicted in FIG. 4, a controller 406 is operatively connected to a sensor 404. The controller 406 may be in communicative connection to a communications assembly 408, such as a cellular connection, WiFi, Bluetooth, LoRA, Zigbee, other wireless, or wired connection. In some embodiments, the controller may be a system on a chip (SoC), as simple as a Raspberry Pi, or as sophisticated as a purpose-built circuit board, and purpose written firmware, that supports the sensor 404, communications assembly 408, and other necessary components, such as a valve 402 relay, as peripherals, using appropriate instructions in the form of software or firmware. The components may be arranged together in a single housing to form a single sensor and control unit 50 for installation as depicted in FIG. 5. An engine 400 includes an air intake that may have an air intake valve 402. As depicted in FIG. 5, the controller may be in operative communication with the air intake valve 402 via a wired connection 502.

Systems and devices in accordance with the present disclosure may include a gas sensor to evaluate the incoming air to the engine and means for stopping the engine including electrical signals to stop the engine in a more or less conventional way and signals to operate a valve to stop the incoming flow of air to the engine. In the case of diesel engines, shutting off fuel or power does not necessarily stop the engine from running in the case of explosive gas mixed with the incoming air. In this case, if the combustion gas level is below a critical threshold, the engine may be stopped in conventional ways. If the combustion mixture is above a critical threshold, enough combustible material is in the incoming air and simply conventional kill methods do not work. The air flow must be stopped by means of a valve or other methods to deprive the engine of air and fuel including but not limited to an ancillary flow of nitrogen, $CO_2$, or another diluent.

Such devices, which may comprise a gas sensor that can detect low levels of explosive, combustible, or suffocating gases may be disposed on the incoming air intake or close to the air intake or in the same environment as the incoming air. Even low concentrations of gas in the air will be increased by Henry's Law of partial pressures to be explosive. A concentration of say 2% methane in air, well below the lower explosive level, or LEL, may well be explosive when pulled into an engine.

Some gas sensors that can be used with systems and devices in accordance with the present disclosure include thin film array sensors, SAW planar chemical sensors, sorbent polymer-based acoustic wave sensors, cantilevered probe sensors and other sensors capable of detecting, quantifying, and/or identifying flammable or explosive vapors. Multichannel array sensors that can be used to classify, identify and quantify unknown chemical vapors can be especially useful. Preconcentrators used with chromatographic analysis can also be used. Illustrative examples of sensor components and systems that may be used in accordance with the present disclosure include those disclosed in the following patents and patent applications, the contents of which are incorporated herein in reference in their entireties: U.S. Pat. No. 6,015,869, entitled STRONGLY HYDROGEN-BOND ACIDIC POLYMER AND METHODS OF MAKING AND USING; U.S. Pat. No. 6,991,887, entitled Photopatternable sorbent and functionalized films; U.S. Pat. No. 7,430,928, entitled Method and apparatus for concentrating vapors for analysis; U.S. Pat. No. 8,191,435, entitled Method and apparatus for concentrating vapors for analysis; U.S. Pat. No. 9,547,968, entitled Pre-smoke detector and system for use in early detection of developing fires; U.S. Pat. No. 9,625,401, entitled Molecular analysis using micro electro-mechanical sensor devices; US Patent Application Publication 20170153193, entitled MOLECULAR ANALYSIS USING MICRO ELECTRO-MECHANICAL SENSOR DEVICES; U.S. Pat. No. 7,260,980, entitled Liquid cell and passivated probe for atomic force microscopy and chemical sensing; U.S. Pat. No. 8,136,385, entitled Cantilevered probes having piezoelectric layer, treated section, and resistive heater, and method of use for chemical detection; U.S. Pat. No. 8,746,039, entitled Cantilevered probes having piezoelectric layer, treated section, and resistive heater, and method of use for chemical detection; U.S. Pat. No. 8,524,501, entitled Self-sensing array of microcantilevers for chemical detection; Great Britain Patent No. 4,232,001, entitled Self-sensing array of microcantilevers for chemical detection; U.S. Pat. No. 7,694,346, entitled Cantilevered probe detector with piezoelectric element; U.S. Pat. No. 8,434,160, entitled Cantilevered probe detector with piezoelectric element; U.S. Pat. No. 8,434,161, entitled Cantilevered probe detector with piezoelectric element, U.S. Pat. No. 8,713,711, entitled Cantilevered probe detector with piezoelectric element; Great Britain Patent No. 4237753, entitled Cantilevered probe detector with piezoelectric element; U.S. Pat. No. 7,521,257, entitled Chemical sensor with oscillating cantilevered probe and mechanical stop; U.S. Pat. No. 8,367,426, entitled Chemical sensor with oscillating cantilevered probe; U.S. Pat. No. 8,220,067, entitled Cantilevered probe detector with piezoelectric element; U.S. Pat. No. 9,702,861, entitled Cantilevered probe detector with piezoelectric element; U.S. Pat. No. 9,726,665, entitled Self-sensing array of microcantilevers for chemical detection; US Patent Application Publication 20170269052, entitled CANTILEVERED PROBE DETECTOR WITH PIEZOELECTRIC ELEMENT; US Patent Application Publication 20170299584, entitled SELF-SENSING ARRAY OF MICROCANTILEVERS FOR CHEMICAL DETECTION, US Patent Application Publication 20160341765, entitled CANTILEVERED PROBES HAVING PIEZOELECTRIC LAYER, TREATED SECTION, AND RESISTIVE HEATER, AND METHOD OF USE FOR CHEMICAL DETECTION; US Patent Application Publication 20170069187, entitled PRE-SMOKE DETECTOR AND SYSTEM FOR USE IN EARLY DETECTION OF DEVELOPING FIRES; US Patent Application Publication 20180052124, entitled SYSTEMS AND METHODS FOR DETERMINING AT LEAST ONE PROPERTY OF A MATERIAL; U.S. application Ser. No. 15/891,070, entitled PRE-SMOKE DETECTOR AND SYSTEM FOR USE IN EARLY DETECTION OF DEVELOPING FIRES; U.S. Application Ser. No. 62/463,395, entitled LEAK DETECTION SYSTEM AND RELATED METHODS; PCT Application PCT/US18/15728, entitled LEAK DETECTION SYSTEM AND RELATED METHODS; U.S. Application Ser. No. 62/466,173 entitled HYDROGEN SULFIDE FILTERS, METHODS OF FORMING THE HYDROGEN SULFIDE FILTERS, AND SYSTEMS INCLUDING SUCH FILTERS; U.S. Application Ser. No. 62/490,227 entitled MICROHOTPLATE GAS SENSORS AND RELATED METHODS; U.S. Pat. No. 6,408,250, entitled Methods for characterizing, classifying, and identifying unknowns in samples; and U.S. Pat. No. 6,606,567, entitled Methods for characterizing, classifying, and identifying unknowns in samples. As noted above, the contents of each of these patents and patent applications are incorporated by reference herein in their entireties.

For these and other reasons, it is desirous to require any engine that is at an oil and gas, refining, production, or other chemical-based site to have a system to detect combustion or explosive materials in the incoming air to eliminate the danger of overspeed or over revolution, including methods to kill the engine upon detection of the explosive mixtures. Devices and systems in accordance with the present disclosure will trigger a shutdown of the engine upon detection of explosive mixture of air and combustible materials in the air intake system or nearby of the engine. Upon detection of a critical amount by the sensor and communication to the controller, either set by the factory or by the user, the controller will send a kill signal to shut off the engine. Because the self-sustaining threshold has not been reached, the engine will cease operation, and will not be able to run on combustible products in the air alone. This corresponds to the cutoff threshold. If the gas increase is too great to respond in time, an additional means such as a valve to stop incoming air can be actuated as well, or a flood with a noncombustible diluent such as nitrogen or $CO_2$ or similar. This corresponds to the failsafe threshold.

Thus, the devices and systems in accordance with the present disclosure can detect a dangerous air fuel condition before the air fuel mixture is introduced into the engine and to stop the engine before the air/fuel mixture introduced from the air intake reaches critical valves. Such systems are capable of analyzing explosive mixtures in the air reaching the engine and sending or causing to send signals to kill the engine through various means.

Recent technological developments have allowed the manufacture of devices that are capable of gas analysis that may identify gases and evaluate their concentrations. These devices may take continuous or discreet samples of the surrounding air to determine the composition of the air. One method of function of these devices is to absorb gas molecules and compare the absorption to known values thereby determining the type and concentration of the gas. The devices may be incorporated into a system containing a microprocessor, memory, storage, input/output channels, wired or wireless communication, GPS, and the detector itself. Systems where the total function needed to form an operable computer is included on a single device or as a part of a small electronics device are typically referred to as a System on a Chip (SoC). SoCs have the advantage of integrating all the necessary components to form an operational computer system in a small form factor. These SoCs may be configured to interface with the engine management systems present on all modern electronically controlled engines, interface with transmission management systems, interface with external engine safeties such as the previously mentioned air intake shut off valves, or interface with other systems present on the engine. In some examples, the devices capable of gas analysis can be a standalone device which interfaces directly with ESDs and engine control systems.

The sensor devices capable of gas analysis may rely on several separate sensors within the device itself to identify and quantify the gases. Several techniques including but not limited to the technique known as orthogonal analysis can be performed on signals received from the sensors to determine the identity and quantity of the gases present in a particular sample. Some examples of sensors include physical characterization sensors such as density sensors, thermal conductivity sensors, diffusion rate sensors, evaporation rate sensors, chemically selective redox sensors, chemical solubility sensors such as acidic, basic, dispersion coefficient, and dipolarity sensors, thermodynamic analysis sensors such as differential scanning calorimetry sensors, thermodynamic analysis sensors such as differential scanning calorimetry sensors and thermal gravimetric sensors, as well as separation through small scale chromatography or other means. As previously discussed, there exists standalone gas sensors, arrayed gas sensors, and SoC based sensors. Often standalone sensors are limited to detection of specific gases such as methane, and incorrectly report other species and also have high detection limits. By using multiple sensors or SoC sensors and orthogonal analysis, the identity of a very broad range of gases and vapors may be accurately determined. The SoC is an example of a micro-electrical-mechanical system (MEMS) and exploits the many inherent advantages of MEMS such as low power consumption, small size, low weight, and robustness for real world applications. For example, in a span of milliseconds the sensors may heat to a high temperature, make a variety of high-precision thermal measurements, then cool back to room temperature. The detector may detect picogram-scale masses and measure temperature with 0.01 degree C. resolution. It may operate in temperatures from −40 degrees C. to 70 degrees C. The detector can incorporate an array of microcantilevers with integrated piezoelectric sensing elements that provide electrical actuation and sensing of resonance frequency. Monitoring resonance may be a highly sensitive way to measure very small masses of adsorbed materials. Examples of suitable MEMS detectors with gas sensing capabilities are available from Nevada Nano Systems Inc. See U.S. Pat. No. 6,015,869, entitled STRONGLY HYDROGEN-BOND ACIDIC POLYMER AND METHODS OF MAKING AND USING; U.S. Pat. No. 6,408,250, entitled METHODS FOR CHARACTERIZING, CLASSIFYING, AND IDENTIFYING UNKNOWNS IN SAMPLES; U.S. Pat. No. 6,991,887, entitled Photopatternable sorbent and functionalized films; U.S. Pat. No. 6,606,567, entitled Methods for characterizing, classifying, and identifying unknowns in samples; U.S. Pat. No. 7,430,928, entitled Method and apparatus for concentrating vapors for analysis; U.S. Pat. No. 8,191,435, entitled Method and apparatus for concentrating vapors for analysis; U.S. Pat. No. 9,547,968, entitled Pre-smoke detector and system for use in early detection of developing fires; U.S. Pat. No. 9,625,401, entitled Molecular analysis using micro electro-mechanical sensor devices; US Patent Application Publication 20170153193, entitled MOLECULAR ANALYSIS USING MICRO ELECTRO-MECHANICAL SENSOR DEVICES; U.S. Pat. No. 7,260,980, entitled Liquid cell and passivated probe for atomic force microscopy and chemical sensing; U.S. Pat. No. 8,136,385, entitled Cantilevered probes having piezoelectric layer, treated section, and resistive heater, and method of use for chemical detection; U.S. Pat. No. 8,746,039, entitled Cantilevered probes having piezoelectric layer, treated section, and resistive heater, and method of use for chemical detection; U.S. Pat. No. 8,524,501, entitled Self-sensing array of microcantilevers for chemical detection; Great Britain Patent No. 4232001, entitled Self-sensing array of microcantilevers for chemical detection; U.S. Pat. No. 7,694,346, entitled Cantilevered probe detector with piezoelectric element; U.S. Pat. No. 8,434,160, entitled Cantilevered probe detector with piezoelectric element; U.S. Pat. No. 8,434,161, entitled Cantilevered probe detector with piezoelectric element, U.S. Pat. No. 8,713,711, entitled Cantilevered probe detector with piezoelectric element; Great Britain Patent No. 4237753, entitled Cantilevered probe detector with piezoelectric element; U.S. Pat. No. 7,521,257, entitled Chemical sensor with oscillating cantilevered probe and mechanical stop; U.S. Pat. No. 8,367,426, entitled Chemical sensor with oscillating cantilevered probe; U.S. Pat. No. 8,220,067, entitled Cantilevered probe detector with piezoelectric element; U.S. Pat. No. 9,702,861, entitled Cantilevered probe detector with piezoelectric element; U.S. Pat. No. 9,726,665, entitled Self-sensing array of microcantilevers for chemical detection; US Patent Application Publication 20170269052, entitled CANTILEVERED PROBE DETECTOR WITH PIEZOELECTRIC ELEMENT; US Patent Application Publication 20170299584, entitled SELF-SENSING ARRAY OF MICROCANTILEVERS FOR CHEMICAL DETECTION, US Patent Application Publication 20160341765, entitled CANTILEVERED PROBES HAVING PIEZO-ELECTRIC LAYER, TREATED SECTION, AND RESISTIVE HEATER, AND METHOD OF USE FOR CHEMICAL DETECTION; US Patent Application Publication 20170069187, entitled PRE-SMOKE DETECTOR AND SYSTEM FOR USE IN EARLY DETECTION OF DEVELOPING FIRES; US Patent Application Publication 20180052124, entitled SYSTEMS AND METHODS FOR DETERMINING AT LEAST ONE PROPERTY OF A MATERIAL; U.S. application Ser. No. 15/891,070, entitled PRE-SMOKE DETECTOR AND SYSTEM FOR USE IN EARLY DETECTION OF DEVELOPING FIRES; U.S. Application Ser. No. 62/463,395, entitled LEAK DETECTION SYSTEM AND RELATED METHODS; PCT Application PCT/US18/15728, entitled LEAK DETECTION SYSTEM AND RELATED METHODS; U.S. Application Ser. No. 62/466,173 entitled HYDROGEN SULFIDE FILTERS, METHODS OF FORMING THE HYDROGEN SULFIDE FILTERS, AND SYSTEMS INCLUDING SUCH FILTERS; U.S. Application Ser. No. 62/490,227 entitled MICROHOTPLATE GAS SENSORS AND RELATED METHODS. The contents of which are incorporated herein in their entireties.

As previously mentioned, current ESDs and other safety systems rely on engine RPM to make a determination if the engine is over revving or entering a dangerous operating regime. These methods used are reactive to the RPM increase and do not have the ability to prevent the RPM overrun before it begins. In some cases, the increased RPM may occur suddenly and without warning, leading to damage to the engine before shutdown systems can be engaged. Furthermore, once an engine such as a diesel engine begins to run away, it can be difficult to stop without means that may damage the engine such as the sudden closure of the air intake system.

Other examples of ESD in accordance with the present disclosure can comprise systems for shutting off gas or fuel to industrial equipment and processes. For example, without limitation, a furnace or boiler may combust a fuel source such as methane. In an embodiment, the SoC, single gas detector, or array of detectors may send a signal to a control system of a furnace or boiler or other industrial or home product which in turn shuts of the natural gas or other fuel supply. In another embodiment, the SoC, single gas detector, or array detectors of detectors may send a single directly to a control valve. In yet another embodiment, the choice of detector may be part of a network that provides action to valves not yet undergoing hydrocarbon detection. In another embodiment the detectors communicate with other detectors and can coordinate a large detection area. Yet other embodiments allow the position of the detectors to be known via GPS or other means including triangulation from long range wireless networks such as LoRA, Zigbee or others. Other embodiments allow the detectors and system to monitor by various means the wind direction and provide action to downwind systems while upwind systems may not be actuated. Other embodiments may use a central controller to coordinate several local devices. Other embodiments use the cloud to have storage, calculation, notification and the like. Other embodiments include notification via text, email, call or internet, from single or a small number of actuations. Still other embodiments use a web or browser-based application to determine detector history, current detector performance, geographic location of detectors, members of a local network and the like.

Figure 6:
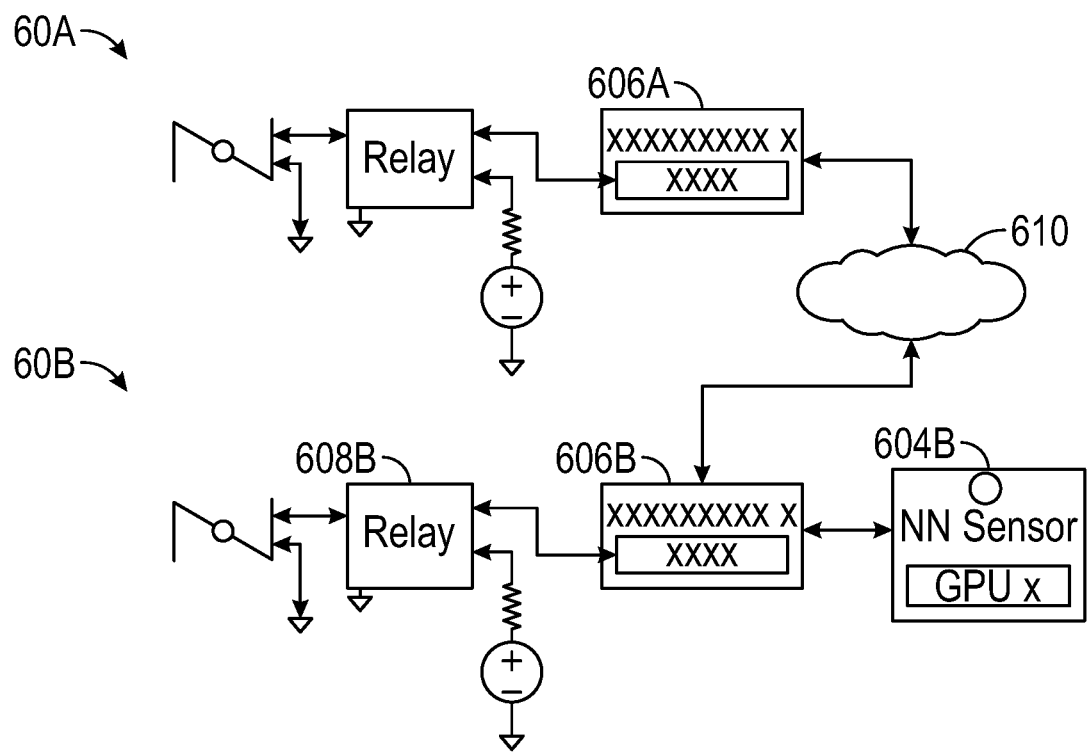
FIG. 6 depicts a schematic arrangement of a plurality of gas sensors some or all of which in conjunction with shutoff valves, with communication to a local central site for local central control and monitor.

Turning to FIG. 6, a schematic arrangement of a plurality of gas sensors shutoff device assemblies, such as those depicted at 60A and 60B, some or all of which in conjunction with shutoff valves. Each assembly includes a controller 606, which includes a chip that may execute code or other instructions to execute processes in accordance with the present disclosure, one or more sensors 604 as discussed elsewhere herein, and one or more relays for executing the kill signals whether by electronic communication with the engine electrical or control system, or by communication with a valve or a valve control solenoid. Additionally, the controller 606 may be in communication with a network 610 such as wireless communications to a local area network to allow control and monitoring at a local central site.

Figure 7:
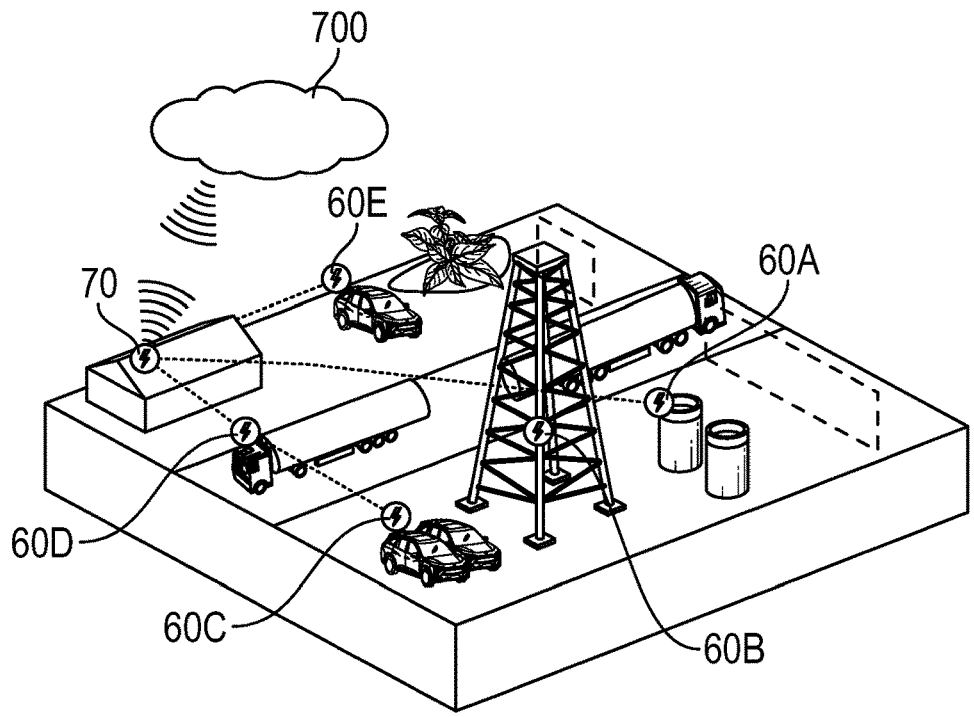
FIG. 7 schematically depicts one arrangement of several sensors based at multiple locations in a given site with communication to a local central controller in accordance with the present disclosure.

FIG. 7 graphically depicts one arrangement of several sensors based at multiple locations in a given site with communication to a local central controller in accordance with the present disclosure. These may be assemblies 60A through 60F placed on or near engines throughout a hydrocarbon production or processing site. These include assemblies 60*f* and 60D on or near engines on vehicles. A local central controller 70 may also be disposed at the site. The assemblies 60 and local central controller 70 may be in operative communication via a wireless network or wired networks or as is otherwise known in the art. The local controller 70 may be in communication with a cloud 700 based backup or remote controller.

Figure 8:
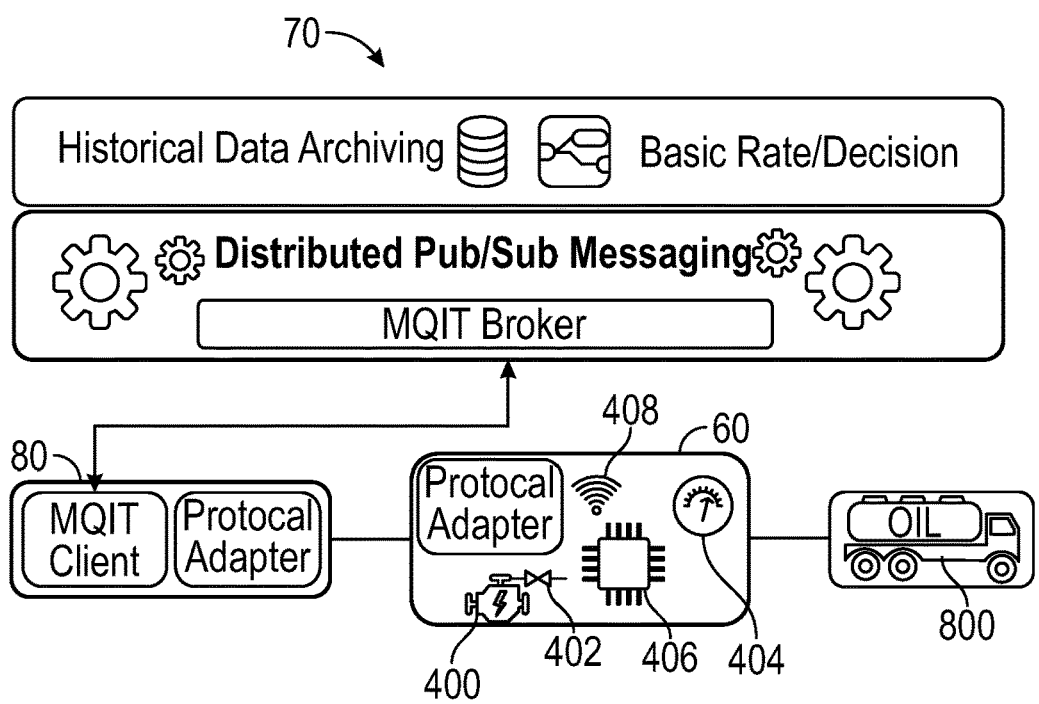
FIG. 8 depicts a schematic arrangement of a mobile vehicle-based sensor communicating with a wireless gateway using a MQTT client/broker and cloud-based services including basic rule decision making for valve response as well as historical data archiving that can be useful with certain embodiments in accordance with the present disclosure.

FIG. 8 depicts a schematic arrangement of a mobile vehicle-based sensor device 80 communicating with a wireless gateway at a local controller 70 using a MQTT client/broker and cloud based services including basic rule decision making for valve response as well as historical data archiving that may be useful with certain embodiments in accordance with the present disclosure. The use of wireless communications protocols such as MQTT allows for vehicles using sensor assemblies 60 to join and exit a networked system in accordance with the present disclosure as the vehicle enters and leaves a location, as depicted in FIG. 7. This allows for complete monitoring of all engines in a location. It will be appreciated that any appropriate communications protocol may be used.

Figure 9:
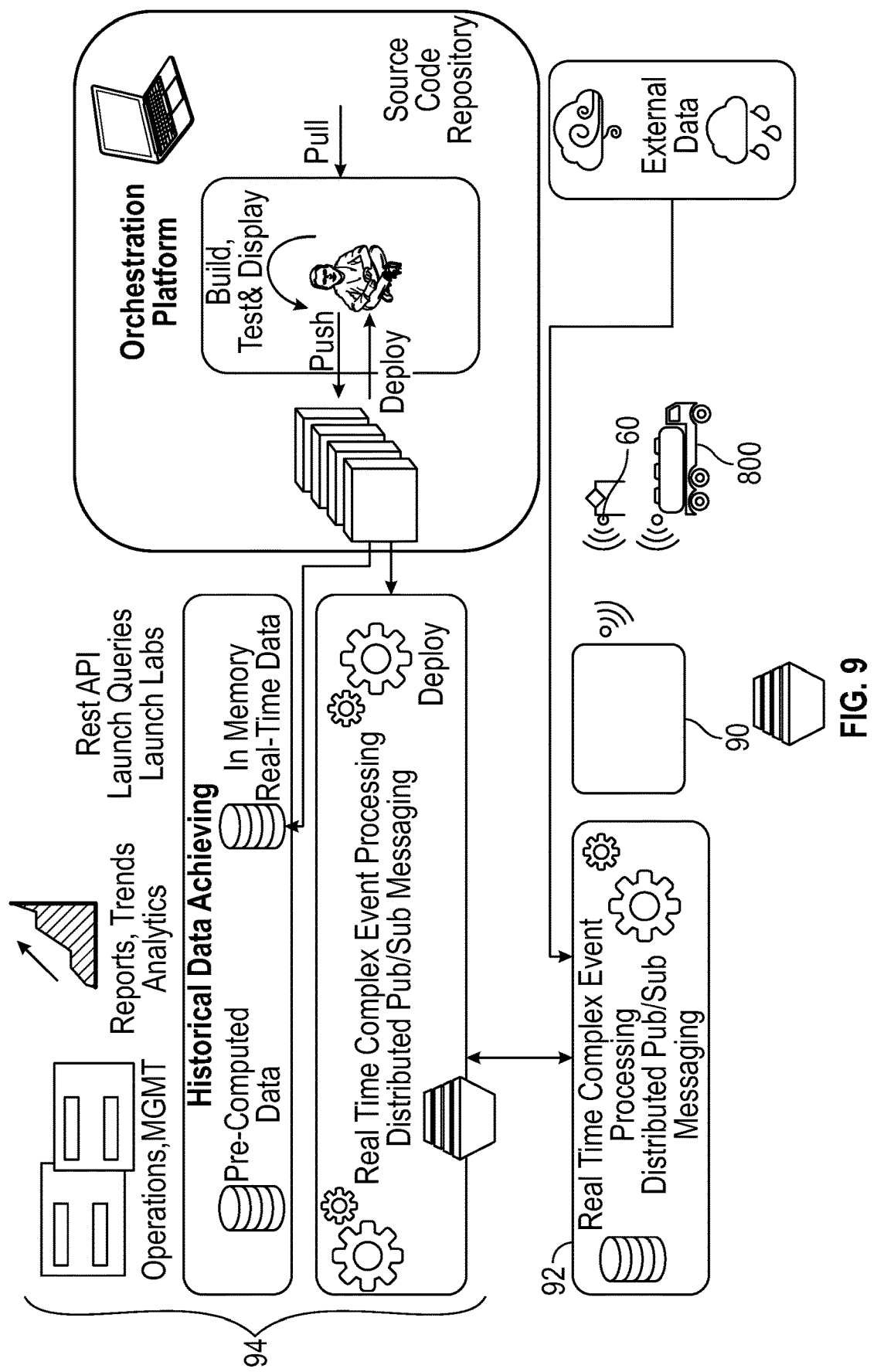
FIG. 9 depicts a schematic arrangement of one illustrative embodiment of a cloud-based system and network in accordance with the present disclosure including a sensor-based truck with valve, a local gateway, an edge platform that is also tied to external data such as weather, a real time complex event processing pub/sub messaging system, historical data archiving and a management layer and historical information.

FIG. 9 depicts a schematic arrangement of one illustrative embodiment of a cloud-based system and network in accordance with the present disclosure including a sensor-based truck 800 with an air shutoff valve that includes a sensor assembly 60, a local gateway 80, an edge platform 90 that is also tied to external data such as weather, a real time complex event processing pub/sub messaging system, historical data archiving and a management layer and historical information. It will be appreciated that the edge platform may be supported on a local central controller 70 or on a remote computing device. It will also be appreciated that the use of a networked system allows for individual assemblies 60 to shut down all engines in an area of concern, even where only a single sensor assembly detects a concentration at or above a cutoff or failsafe threshold. Further, archiving of historical data may allow for historical analysis to diagnose problems and facilitate better planning for the prevention of, and response to, dangerous conditions.

Figure 10:
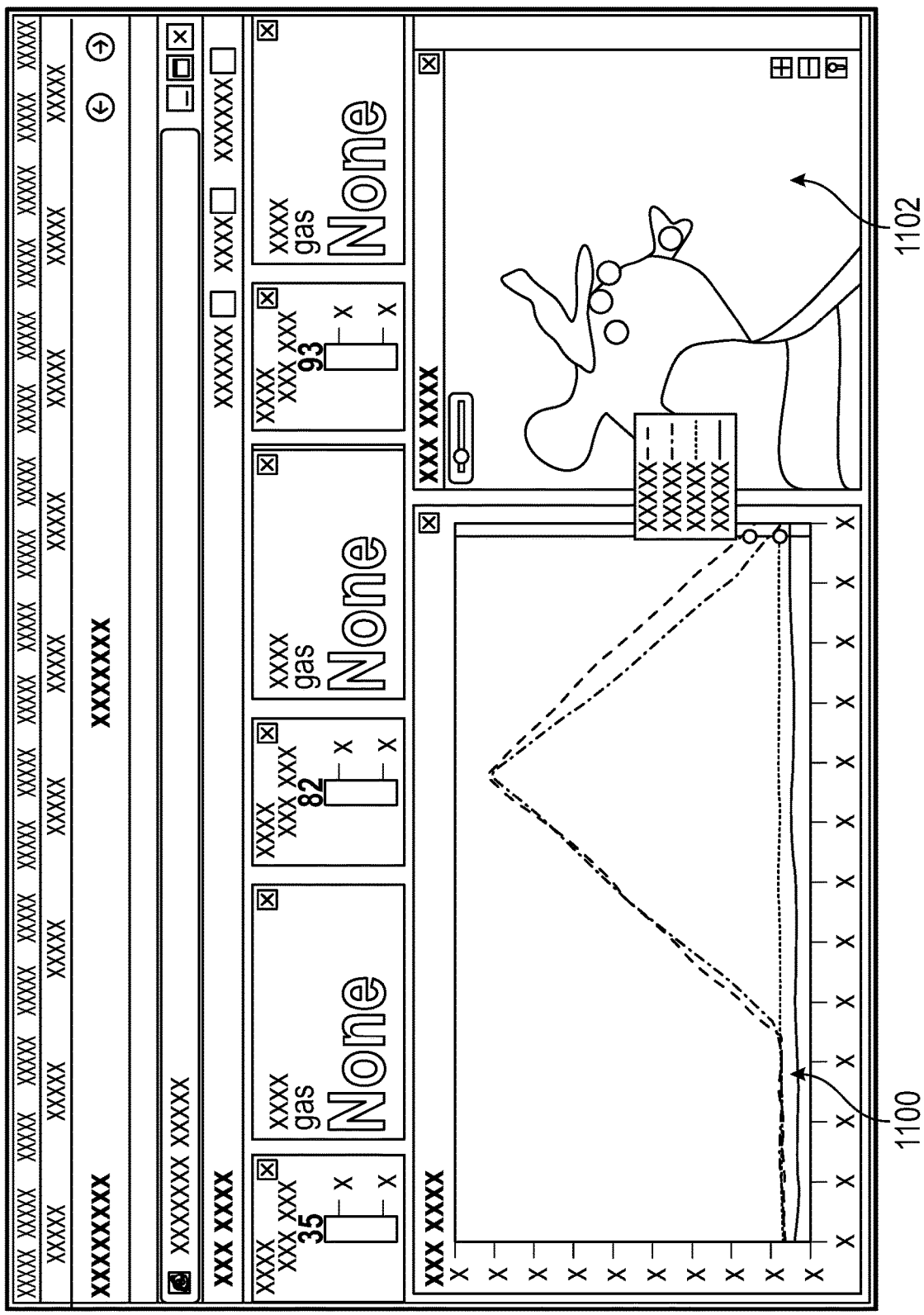
FIG. 10 depicts a cloud-based, or browser-based, display of sensor data and user configuration useful with some embodiments of the present disclosure.

FIG. 10 depicts a cloud-based, or browser-based, display of sensor data and user configuration useful with some embodiments of the present disclosure, such as those schematically depicted in FIGS. 8 and 9. As shown, such display may be available on a computer display, including a display on a mobile device, which is in communicative contact with a network as discussed in connection with FIG. 9 or may be a portion of, or in connection with, a local controller 70 as discussed in connection with FIG. 8.

As depicted in FIG. 10, such a system may allow a user to select individual sensor assemblies or sets of assemblies at a location. The displayed map 1100 depicts the locations of a set of monitored assemblies 60 in communication with the system. A graphic display 1102 may show historical concentration levels for selected assemblies 60, with real time or historical point data displayed numerically as selected.

Use of systems and devices in accordance with the present disclosure allow for the processes and methods of the present disclosure to be achieved. For example, a detector assembly 60 may send a signal to the engine management system or other controls systems present on an engine which may then shut off the engine if a concentration of explosive or flammable gas is detected at a or above a cutoff threshold. The engine may be shut off by any means such as for example, by a kill switch that disables either some sub system of an engine, a command to the engine computer, the electrical system or other means that can stop a spark in a gasoline engine, stop air, stop fuel, or engaging a higher gear to reduce engine speed, engaging a decompression valve to reduce pressure within the engine, disabling valves in a freevalve or independently operated valve engine, stopping exhaust flow to the engine, introducing a diluent to dilute the incoming gas to below a critical threshold, or combination of the above techniques. In some examples, the detector assembly may be directly connected to an air intake shut off, as depicted in FIG. 5 such that the air intake may be blocked before the air fuel mixture can enter the engine. This example may be provided as a backup function or as a dual protection system. Furthermore, the detector assembly 60 may be disposed on the engine or near where air is drawn into the engine such as an air filter, breather box or other means.

In one illustrative embodiment, a detector assembly 60 may be used in engine safety applications and more particularly with ESDs. The assembly may provide a means to determine the composition of air entering an engine and identify any flammable or explosive gases contained therein. Appropriate action may then be taken to prevent the engine from becoming uncontrolled. A first embodiment comprised the detector taking measurements and identifying the gas, calculating the explosive limits of the gas and sending a signal to an ESD or engine management system or network for additional routing to a controller or other additional system. This may include but not be limited to sending a kill signal to the engine, sending a signal to an emergency shutoff valve, sending a signal to another sensor for action, sending a signal to a central local system for coordination, or sending information to a cloud based or other remote system by cellular, sat-phone or other means.

In another illustrative embodiment, the detector assembly may take measurements and identify the gas and/or is concentration and then send the data regarding the identified gas to a separate system which may determine an appropriate action. In some examples, a detection limit threshold may be used to determine the course of action.

The gas sensors used in the assemblies may have the ability to determine specific gas species. That is, hydrogen will be distinguished from methane, which will be distinguished from naphtha. In the case of each gas, a different course of action will be taken. For instance, if the sensor detects naphtha, this will most likely arise due to spilled cleaning solvents and will not require significant action. If the device detects propane, in the out of doors, again only limited action will need to be taken because propane for instance is lighter than air and will dissipate. If the device detects methane, this can be a significant event because methane is heavier than air and will collect and will potentially explode. Hence a different action will be required to respond to methane detection.

As noted above, each assembly 60 may include a controller that will allow the hardware, software and firmware to be executed to produce the required actions. The response to a given concentration and species of gas will be directed by the controller. The system or assembly will also have a given response to a given gas concentration and species. The response to the various detected gases can be for instance specified by a look-up table, or by calculated stimulus and response. Different gases detected will require different responses. In addition, the response will be changeable or editable due to user editing of response by means including a cloud based or browser-based user interface or UI. Responses can include but not be limited to an electronic kill signal, a signal to close an air intake valve, communication with another sensor and controller, communication with a central controller, communication with a cloud base information repository or other means.

In general, each assembly 60 and the local central controller 70 (where present) will also have subsystems including a source of internal power (such as an internal battery), so that in the event of power failure, the device will still be able to provide the required engine control, air intake shutoff, gas species and concentration and evaluation and similar functions.

By use of the communications protocols and hardware, the assemblies 60 will have the capability to form a network with other similar devices or with other devices that are appropriate. Some sensor assemblies 60 will be permanently located so that the network location for those assemblies are fixed. For example, a sensor assembly disposed near an internal combustion engine for an emergency backup generator at a fixed position may be fixed. As noted previously, networks and systems in accordance with the present disclosure may also have the ability to allow new sensor devices to enter the network when certain events are fulfilled such as a sensor attached to a mobile asset such as a truck or car or mobile engine enter within a specified radius or other specific criteria. The network forming capability is significant insomuch as sensor devices that have not yet detected explosive concentrations may be activated in anticipation of an imminent explosive event. This flexible and distributed array of sensors will allow the maximum evaluation of an area, including the maximum number of sensors possible.

Systems in accordance with the present invention may have the ability to display on a mobile device detected results, and the set points for control. Users will be able to see gas concentrations and if the device was close to a response or valve closing. In addition, the devices are comprised of a GPS for location in the radius of interest. The system may have the ability to edit control points by means of a desktop, laptop, or mobile device. Access will be allowed with typical methods to gain access such as password, biometrics or the like. The radius of a site can be established as well.

Each assembly or the networked system may have the ability to record or log events so that offline or external agencies or agents can determine gas release events. In addition, a user may be able to determine if the release of gas was correlated or systematic, such as the closing of a valve or for instance non-correlated.

Once triggered, an assembly 60 may keep the engine to which it is attached in lockout until suitable authorization to unlock is received. Suitable authorization may come from a designated or authorized person or another suitable agent to release the valve-detector assembly and allow reset.

In other embodiments, a gas detecting device and processor may be tied into the electronic engine controller and programmed to send a signal to the electronic controller to shut the engine off if an explosive gas is detected as the target level. In certain embodiments, the detector and required processor may be tied directly to a kill switch to disable the engine directly by operating the shutdown, while in others the gas detection system may be tied directly to the engine processor or the engines computer, and the engine is programmed to shut itself off if gas is detected at the target level.

In embodiments where the detector and controller are tied to an air intake shut off or over speed protection shut off valve and programmed to send a signal that would activate the air intake shut off in the event that it detected explosive gases at the target level. In some such embodiments, the detector may be tied directly to the overspeed air intake shut off and the air intake shut off and the processor programmed to shut the air off thereby disabling the engine before the explosive limits are reached. These embodiments may provide backup functional or dual protection to the engine and the operation. For some such embodiments, the controller may be in communication through a relay with an EMS for an engine, allowing an EMS based kill signal at a first threshold at a detected concentration of flammable vapor at a level below that sufficient to support n overspeed condition and an air shut off performed at a second or failsafe threshold where an overspeed condition may occur.

For networked embodiments, an external system may perform the calculating and processing for a signal from a detector assembly. The external system identifies the explosive materials from data collected from the detector, and determines if a signal to actuate shutdown is required. In such embodiments, the external processor may be external to an internal computer on a vehicle where the engine is disposed. For some embodiments the detector assembly may send a signal directly to the vehicles internal computer to shut down the engine. The internal computer of the vehicle in these embodiments may be programmed for such circumstances during manufacturing.

It will be appreciated that sensor assemblies and systems suitable in accordance with the present disclosure are suitable for use with any equipment with engines, such as but not limited to generators, trucks, tractors, pumps, automobiles, pressure washers and the like.

It will be further appreciated that a gas detector system in the form of a SoC, single gas detector or array of detectors can be used in a home for gas appliances and devices, monitoring ambient air in proximity to the device or sensor and providing a gas shut off or alarm or shutoff and alarm with ambient gas levels are above a set point. In some embodiments, the home use assemblies may be associated with fire or smoke alarms to shut off gas when fire or smoke is detected.

It will be appreciated that in certain methods in accordance with the present disclosure, the explosive or combustible gas is detected promptly by a sensor element and an electronic kill signal is sent to an engine, thereby eliminating the need for an air flow shut off valve. Conventional systems have a system comprised of an air shutoff and a RPM detector. When the RPM of the engine is over a critically high value, the air intake shutoff valve closes, smothering the engine. The invention uses a gas detector that can evaluate an intake air combustible gas situation before the sustaining combustion situation arises. The subsequent response is to send a kill signal to the engine and shut it off conventionally. In general, there is a concentration variation between detecting an explosive or combustible gas concentration, and the level where the engine will continue to run getting fuel from the air. It is known that about 3% methane is where an engine will run with the diesel fuel shut off. In methods in accordance with the present disclosure, an engine may be shut off at a lower level, for example a concentration of about 1.5% methane as a lower explosion limit (LEL) or cutoff threshold, and subsequently conventional methods of electronic shutdown can be used, avoiding the damage from emergency air intake shutoff in an overspeed condition. Such methods work with conventional gasoline engines, wherein the spark is eliminated or with diesel engines, where the fuel is stopped. The assemblies 60 can be tied into the electronics ports associated with an engine such as DDAC or ODB2 ports, conventional electronic access ports, either in the vehicle cab or in the engine area.

In another embodiment the device is attached or connected or associated with a valve on the air intake in a naturally aspirated engine and evaluates the air incoming to the engine for flammable, explosive or combustible gases or vapors, and upon a set trigger level, actuates the valve shutting off all air to the valve.

In other embodiments, the assemblies may be attached or connected or associated with a valve on the air intake in a naturally aspirated engine and evaluate air near to or close to the engine, not necessarily incoming to the engine, for flammable, explosive or combustible gases or vapors, and upon a set trigger level, actuates the valve shutting off all air to the valve.

It will be appreciated that in networked embodiments, a plurality of valves and sensors in conjunction, all more or less proximate to each other and in communicative communication via a local network either by wires, cables or wirelessly by electromagnetic signals evaluates the naturally aspirated intake air to one or more engines. In the event one device is triggered or detects hydrocarbons or combustible or explosive gases, other nearby valves will be triggered to shut the intake air to nearby engines, even though the explosive gas has not been yet detected by the specific detector and valve systems associated with a particular nearby engine.

In some embodiments, a local collection of valves and sensors are controlled or managed or otherwise managed by a local central controller that can perform tasks such as calculation of shut off points, shut subsequent valves even if no signal is yet detected, record location and severity of events, provide a central nexus and repository of all relevant data, provide a central nexus of data for a browser display and the like.

In another embodiment, a web or browser display in communication with a local controller or network manages information including but not limited to and basically comprised of location, devices in and out of local network, trigger or trip points of detectors, actions taken once sensor records a hydrocarbon, list of hydrocarbons to trigger on and list of hydrocarbons to not trigger on and levels of each, map of sensor network locations, display of wind direction, current reading of each sensor assembly in a networked system. In addition, a web-based browser provides the user with access to data analytics from a system to extract information for the collection of large amounts of data such as hydrocarbon releases when valves are actuated for one example. In addition, running lists of all events locations and severity including events that caused triggers and events that did not cause a trigger can be accessed. Where desirable, the cloud or web-based browser window can be arranged to graphically or numerically set the trip point, the gases to include and those to reject, the radius of the local sensor array.

In certain embodiments, sensor assemblies not associated with an intake valve could be used to evaluate gases emanating from return drilling mud, taking much of the tasks from current mass spectrometers. The use of a SoC based detector in place of a mass spectrometer in the mud return can reduce expenses and further provide meaningful data for a monitoring system to avoid dangerous situations.

It will be appreciated that using devices, systems and methods in accordance with the present disclosure, especially networked electronics including cloud-based communication, wireless communication, data analytics and browser display can be used as a platform for other commercial services such as well logging, asset tracking using GPS, and data recording using cloud based appliances and analytics.

Figure 11:
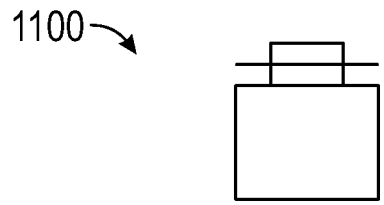
FIG. 11 depicts a single gas sensor that may be installed on an engine for purposes of data collection and historical performance in accordance with the present disclosure.

FIG. 11 schematically depicts a single sensor 1100 that may simply be a detector installed on an engine for purposes of data collection and historical performance. Such a test sensor may be single SoC as discussed previously herein. In one illustrative embodiment sensor will include a gas sensor, a memory, GPS, and wireless communications connectivity. Such a sensor may have the ability to detect type and concentration of explosive gases or vapors, LEL %, pressure, temperature, humidity and humidity. Data from sensor 1100 may be collected by sensor recording gas (species, concentration, rate of increase, and if GPS on board, location). Collection may be made via Bluetooth to a nearby phone, LORA to a gateway placed at the site, or even using Bluetooth on a special handheld data collection device.

Figure 12A:
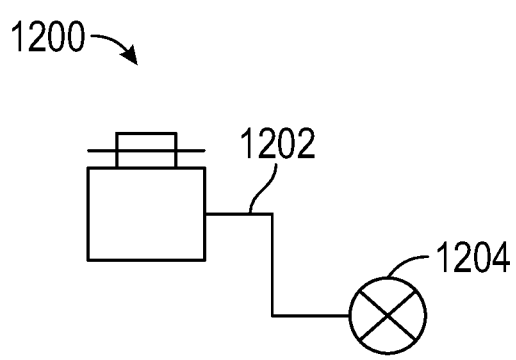
FIG. 12A depicts one embodiment of a single sensor and valve combination in a non-networked deployment for use in accordance with one aspect of the present disclosure.

FIG. 12A schematically depicts a single sensor and valve combination in a non-networked deployment. In this embodiment, a gas sensor 1200 is connected to the air intake of an engine. There is one electrical connection 1202 to the overspeed shutoff valve trigger 1204. This connection can be either wired or wireless. Upon gas detection, the sensor 1204 triggers the valve closed, as discussed previously herein.

In one exemplary use of the embodiment of FIG. 12A, the gas sensor 1200 is connected to the air intake of a naturally aspirated diesel engine. There is one electrical connection to the overspeed shutoff valve trigger 1204. This connection can be either wired or wireless.

In the normal course of use, the embodiment could be installed on a truck used to deliver chemicals or sand to a drilling site, refinery or other location. The engine will potentially be, from time to time, subjected to some forms of hydrocarbons depending on its location. If, during the course of operations, the sensor, hardware and software detect a significant and pre-set amount of some combustible fuel, such as methane, an electric signal will originate from the sensor+control board to electrically close the emergency shutoff valve. The sensor 1200 arrangement allows the gas detection to cause actuation of the emergency air shut off valve long before an overspeed condition arises. Hence, a potential emergency may be dealt with before the engine overspeeds into a dangerous condition.

In one exemplary scenario, the sensor 1200 is installed on the air intake of the engine is in use at a drilling site, or for instance, refinery. During the course of operation, a release of methane occurs and is pulled into the engine. For a conventional truck, the added fuel will cause the engine to overspeed, potentially causing a catastrophic failure. In this instance, however, the system detects the added methane to the engine and causes the overspeed protection valve to close, killing the engine and ensuring no potential explosion or fire. In another exemplary scenario, the system is installed on the air intake of an engine on a fixed prime mover or generator in use at a drilling site, refinery, or other location where flammable vapors may be released. During the course of operation, a release of methane occurs and is pulled into the engine. For a conventional generator or other fixed asset, the added fuel would cause the engine to overspeed, potentially causing a catastrophic failure. In this instance, however, the sensor 1200 detects the added methane to the engine and causes the overspeed protection valve 1204 to close, killing the engine and ensuring no potential explosion or fire.

Figure 12B:
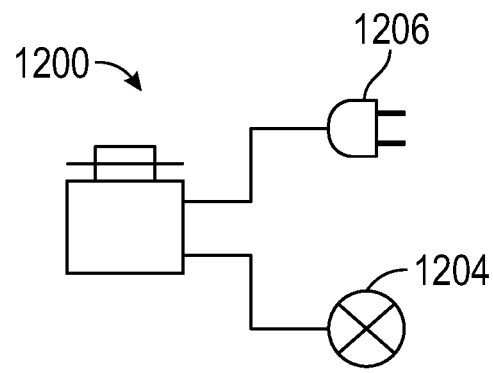
FIG. 12B depicts an embodiment of a single sensor connected to both a shutoff valve and to an engine socket or computer port in proximity to the engine.

FIG. 12B depicts a sensor 1200 connected to both a shutoff valve 1204 and to an engine socket or computer port 1206 in proximity to the engine. Upon first detection of methane or other gas, the system will provide an electronic kill signal, to conventionally stop the engine using electronic or computer signals. Upon gas detection at a user specified level, the systems will send an electronic kill signal to the engine control or computer first via port 1206. If the engine continues to run, an indicated by either increasing gas signature or increasing engine RPM, the system will subsequently send a valve close signal to shutoff valve 1204.

In one exemplary scenario, a service truck or a fixed asset has a system similar to that depicted in FIG. 12B with the sensor 1200 installed on the air intake of the engine. During the course of operation, a release of explosive gas occurs and is pulled into the engine. For a conventional engine, the added fuel in the form of explosive gas would cause the engine to overspeed, potentially causing a catastrophic failure. In this instance, however, the sensor 1200 detects the added methane to the engine and subsequently will send a signal to the ECU (engine control unit) via computer port connection 1206 thereby killing the engine and ensuring no potential explosion or fire occurs. If the amount of explosive gas in the air intake is already high enough to allow the engine to run with no added fuel, the sensor 1200 device will send a second signal to actuate the air intake valve 1204 to cause the overspeed protection valve to close, long before the engine begins to have an overspeed event in excess of 140% redline.

Figure 13:
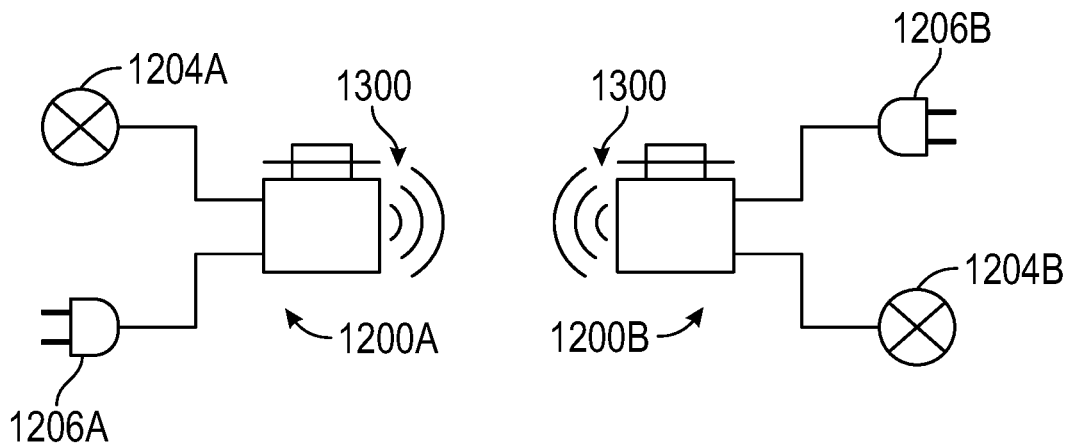
FIG. 13 depicts two sensors similar to that of FIG. 12B using wireless communication to allow sensor to sensor communication.

FIG. 13 depicts wireless communication to allow sensor to sensor wireless communication wherein each sensor 1200A or 1200B is connected by means of a wiring harness or wireless arrangement to both the shutoff valve on the engine air intake as well as the under hood electrical connection to provide an electrical shutoff to the engine control unit (ECU). Each sensor can wirelessly communicate to sensors in the network to close or stop the engine in the event of an explosive gas release.

Although only two sensors 1200A and 1200B are depicted in FIG. 13, it will be appreciated that this is schematic and that any number may be sued to create a mesh of networked sensors and actuators. At a given site, both mobile and fixed assets may contain the sensors. Each device also includes wireless communication to allow sensor to sensor wireless communication wireless, as indicated at 1300. As before, each sensor is connected by means of a wiring harness or wireless arrangement to both the shutoff valve on the engine air intake as well as the under hood electrical connection to provide an electrical shutoff to the engine control unit (ECU).

When a single sensor 1200A or 1200B detects a software based pre-defined level of explosive gas the device will first stop the engine to which it is in communication electronically, or mechanically by valve actuation. Subsequently the sensor will also actuate other kill systems that have been subscribed to be remotely controlled by it. This allows for action to be taken in a geographic zone, even prior to the gas spilling to other engines. This can be accomplished where each sensor can wirelessly communicate to others in close proximity by means of mesh or other network.

In one exemplary scenario all gasoline and diesel engines in a given geographical zone, such as a drilling site or refinery, will be outfitted with wireless sensors 1200, valves and wiring harnesses. Upon an event such as gas release of methane, when one sensor registers a gas event, it first sends a kill signal and if no action, closes its associated valve. After first detection and action, device also sends a signal to other sensor 1200 systems in the area to first send a kill signal and subsequently if no action, close their associated valve.

Figure 14:
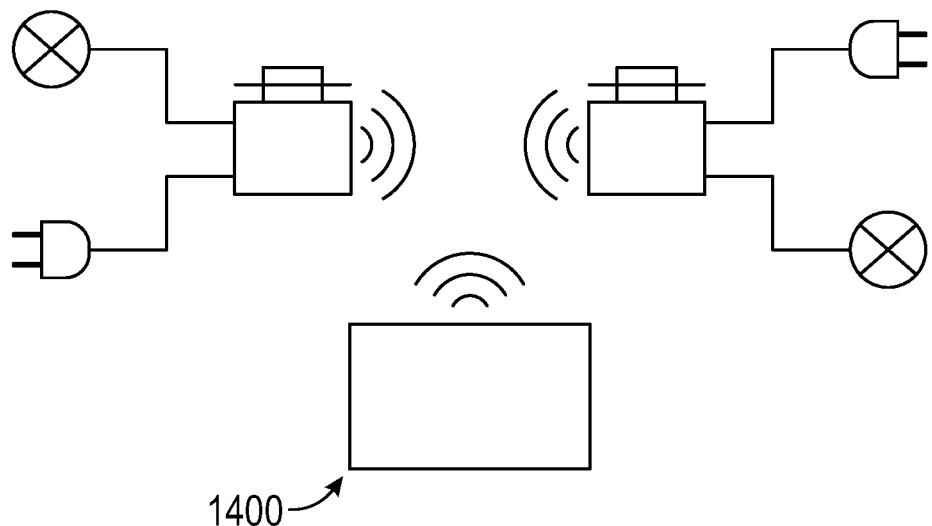
FIG. 14 depicts a central controller that can manage local devices in communication with two sensors in communication

Turning to FIG. 14, a system similar to that of FIG. 13 is depicted with the additional inclusion of a central controller 1400 that can manage all the local devices. Central controller 1400 may be at a fixed location at the site where the mesh network is in use. The central controller 1400 monitors sensors that are local in the mesh and also monitors mobile assets that come or leave the local mesh. It may also have additional information including wind speed and directions, and the ability to provide kill signals to selected devices in an appropriate or chosen area. Additionally, the central controller may include a local display for a user to access and view sensor activity, location of assets and associated tasks.

Figure 15:
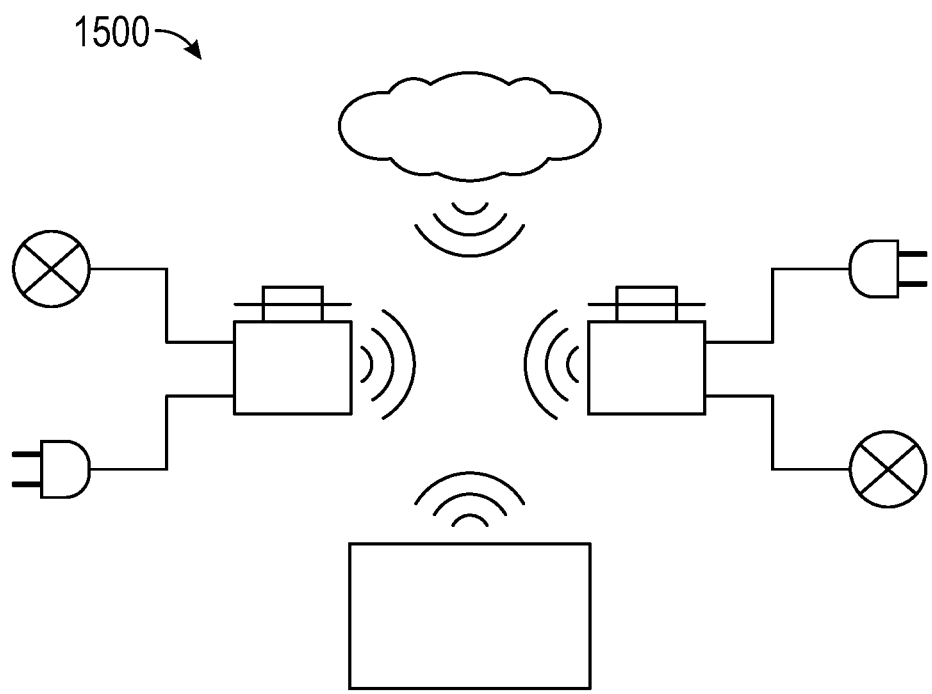
FIG. 15 shows the addition of a cloud-based layer to the embodiment of FIG. 14.

FIG. 15 depicts a system similar to that of FIG. 13 or FIG. 14 with the additional inclusion of a cloud based layer 1500 that can among other things record and control. Such a layer may function as discussed previously herein.

While this disclosure has been described using certain embodiments, it can be further modified while keeping within its spirit and scope. This application is therefore intended to cover any variations, uses, or adaptations of the disclosure using its general principles. Further, this application is intended to cover such departures from the present disclosure as come within known or customary practices in the art to which it pertains and which fall within the limits of the appended claims.

The invention claimed is:

1. A method of activating a pre-set controller, the method comprising: evaluating incident air provided to a first engine with a sensor to detect a concentration of at least one flammable gas in the incident air; determining whether the detected concentration of the at least one flammable compound is at concentration above at least a first threshold concentration; detecting an overspeed condition of the engine using the first threshold concentration and a failsafe threshold; and transmitting a signal to shut down the first engine when the overspeed condition has been detected.

2. The method according to claim 1, wherein evaluating incoming air to a first internal combustion engine with a sensor to detect a concentration of at least one flammable gas in the incoming air comprises identifying the at least one flammable gas.

3. The method according to claim 1, wherein evaluating incoming air to a first internal combustion engine with a sensor to detect a concentration of at least one flammable gas in the incoming air comprises detecting the concentration using a multichannel array sensor.

4. The method according to claim 1, wherein evaluating incoming air to a first internal combustion engine with a sensor to detect a concentration of at least one flammable gas in the incoming air comprises evaluating incoming air using multiple sensors to characterize multiple properties of flammable vapors in the incoming air.

5. The method according to claim 4, wherein evaluating incoming air using multiple sensors to characterize multiple properties of flammable vapors in the incoming air comprises evaluating the incoming air with more than one sensor selected from the group comprising density sensors, thermal conductivity sensors, diffusion rate sensors, evaporation rate sensors, chemically selective redox sensors, chemical solubility sensors, and thermodynamic analysis sensors.

6. The method according to claim 1, wherein evaluating incoming air to a first internal combustion engine with a sensor to detect a concentration of at least one flammable gas in the incoming air comprises evaluating incoming air using orthogonal analysis on a MEMS detector to characterize at least one property of a flammable vapor in the incoming air.

7. The method according to claim 1, wherein evaluating incoming air to a first internal combustion with a sensor to detect a concentration of at least one flammable gas in the incoming air comprises evaluating incoming air at an air intake of the at least first internal combustion engine.

8. The method according to claim 1, wherein transmitting a signal comprises sending an electronic code to an EMS controller to stop the first internal combustion engine.

9. The method according to claim 1, wherein transmitting a signal comprises sending a signal to a valve assembly disposed on an air intake to the first internal combustion engine to stop airflow to the first internal combustion engine.

* * * * *